United States Patent [19]

Testa

[11] Patent Number: 4,838,837
[45] Date of Patent: Jun. 13, 1989

[54] REAR DERAILLEUR FOR BICYCLE GEARS
[75] Inventor: Sandro Testa, Perarolo, Italy
[73] Assignee: Campagnolo S.p.A., Vicenza, Italy
[21] Appl. No.: 215,152
[22] Filed: Jul. 5, 1988
[30] Foreign Application Priority Data Jul. 2, 1987 [IT] Italy .............................. 67571 A/87

[51] Int. Cl.⁴ .............................................. F16H 9/00
[52] U.S. Cl. .................................................... 474/80
[58] Field of Search .................................... 474/78–82
[56] References Cited

U.S. PATENT DOCUMENTS

| 4,277,077 | 7/1981 | Ozaki | 474/80 X |
| 4,619,632 | 10/1986 | Nagano | 474/80 |
| 4,637,808 | 1/1987 | Nakamura | 474/80 |

*Primary Examiner*—Thuy M. Bui
*Attorney, Agent, or Firm*—Sughrue, Mion, Zinn, Macpeak & Seas

[57] ABSTRACT

A rear derailleur for bicycle gears comprises an upper body which can be fixed to the bicycle frame, a lower body carrying a chain tensioning wheel for the bicycle chain and being movable relative to the upper body to bring the chain into selective engagement with a series of sprockets carried by the hub of the rear wheel of the bicycle, and a flexible cable for causing movement of the lower body. The lower body is carried by a control lever supported for rotation on a hollow cylindrical body which is rigidly connected to the upper body. A helical flexion spring is operatively interposed between the control lever and the upper body with its axis coincident with the axis of rotation of the control lever. The spring is preferably housed within the hollow cylindrical body.

8 Claims, 4 Drawing Sheets

REAR DERAILLEUR FOR BICYCLE GEARS

FIELD OF THE INVENTION

The present invention relates to rear derailleurs for bicycle gears, of the known type comprising: an upper body which can be fixed to the bicycle frame, a lower body carrying transmission means for the bicycle chain and connected to the upper body so as to be movable relative thereto to bring the chain into selective engagement with a series of sprockets carried by the hub of the rear wheel of the bicycle, and flexible cable means for causing movement of the lower body.

SUMMARY OF THE INVENTION

The object of the present invention is to produce a rear derailleur which has a strong and reliable structure and which at the same time has small dimensions.

In order to achieve this object, the subject of the invention is a derailleur of the type specified above, characterised in that the lower body of the derailleur is carried by a control lever which is supported for rotation on a member connected rigidly to the upper body, and in that a helical flexion spring is operatively interposed between the control lever and the upper body and with its axis coincident with the axis of rotation of the control lever.

The lower body is articulated to the control lever about an axis parallel to the axis of rotation of the lever and is also directly connected to the upper body by means of an auxiliary connecting rod articulated at its opposite ends to the upper body and to the lower body respectively, about axes parallel to the axis of rotation of the control lever.

In a preferred embodiment, the control lever includes a hub rotatably mounted on a hollow cylindrical support body which is rigidly connected to the upper body of the derailleur. The helical flexion spring is preferably situated within the hollow cylindrical support body, so as to be protected from dirt.

By virtue of the above-described arrangement, the helical flexion spring (which biasses the control lever towards the position corresponding to the engagement of the chain on the smallest-diameter sprocket) stresses solely the control lever, unlike conventional solutions in which the lower body is connected to the upper body by means of an articulated parallelogram joint. In these solutions, the biassing spring is constituted by a pin spring having one arm reacting against the body of one of the two connecting rods of the articulated parallelogram. This causes stressing of all the pins of the articulated parallelogram. It is also necessary to make these connecting rods long enough to ensure an adequate reaction arm for the pin spring, which prevents the production of a unit of small dimensions. These problems, however, are completely overcome by the present invention.

In the present description and in the claims which follow, the term "helical flexion spring" is used to define a helical spring which is adapted to react to forces applied to its ends in the plane perpendicular to the axis of the helix, that is, a spring which is subjected locally to bending stress.

BRIEF DESCRIPTION OF THE INVENTION

Further characteristics and advantages of the invention will become clear from the description which follows with reference to the appended drawings, provided by way of non-limiting example, in which:

FIG. 1 is a front view of a rear derailleur for a bicycle, according to the present invention, FIG. 2 illustrates a detail of FIG. 1 in partial section and on an enlarged scale, FIGS. 3 to 5 illustrate three variants of FIG. 2, and FIG. 6 is a perspective view corresponding essentially to the variant illustrated in FIG. 4.

DETAILED DESCRIPTION OF THE INVENTION

The embodiment illustrated in FIGS. 1 and 2 will be described first of all below. This embodiment is similar, in so far as the arrangement of its main elements is concerned, to that illustrated in FIG. 6. Thus, reference can also be made below to the perspective view illustrated in FIG. 6 in combination with FIGS. 1 and 2.

Figure 1:
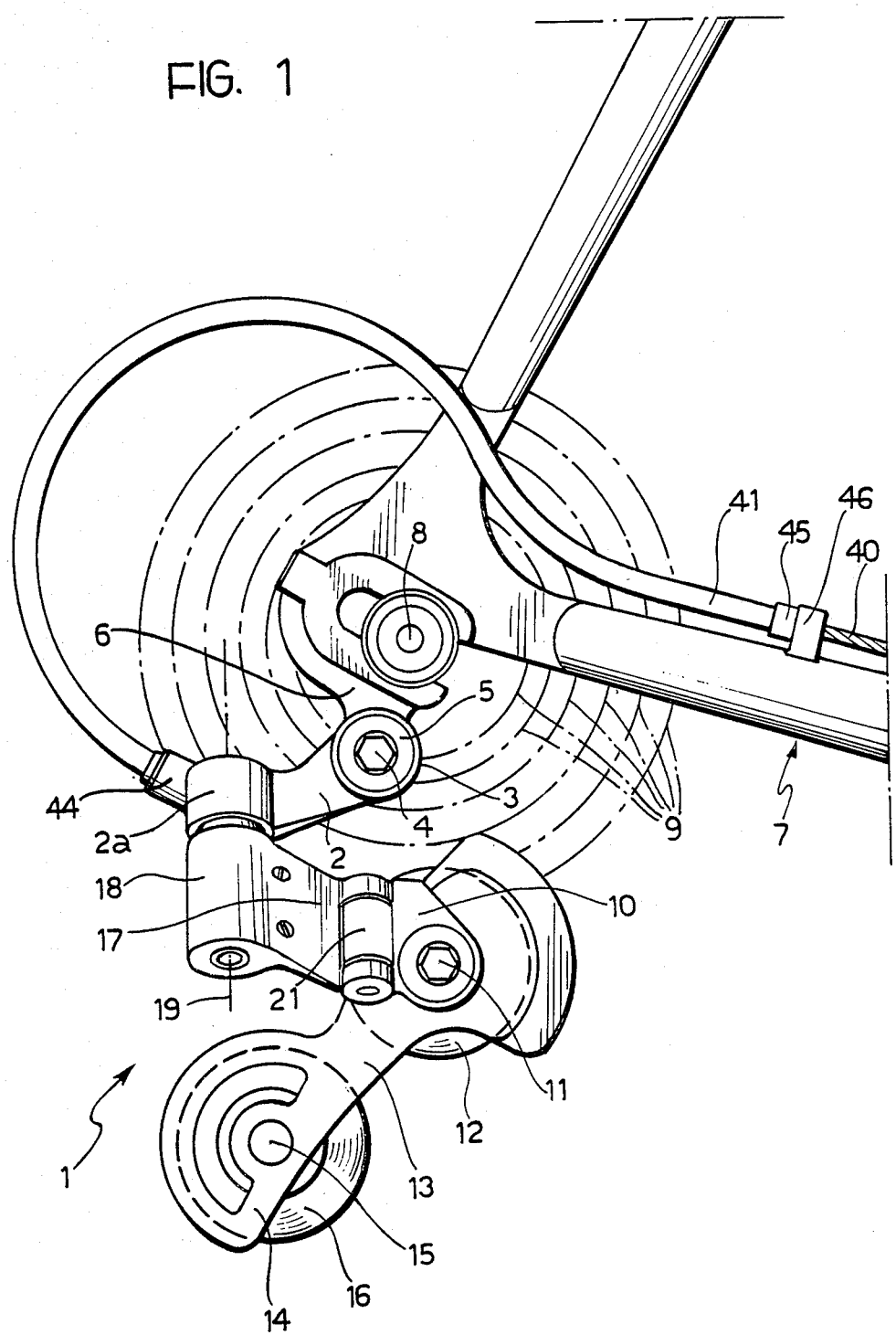
Figure 2:
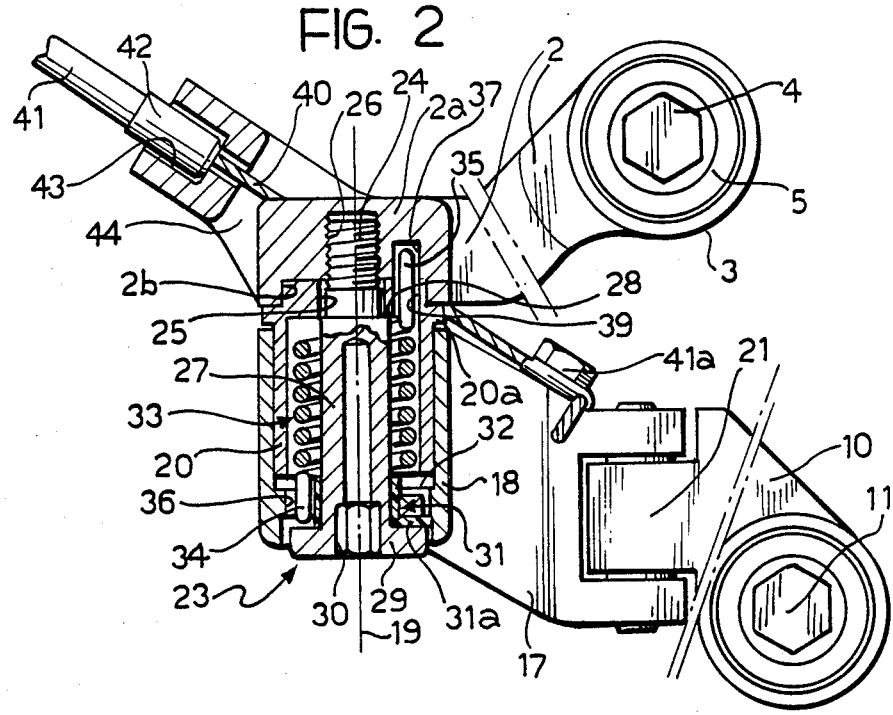
Figure 6:
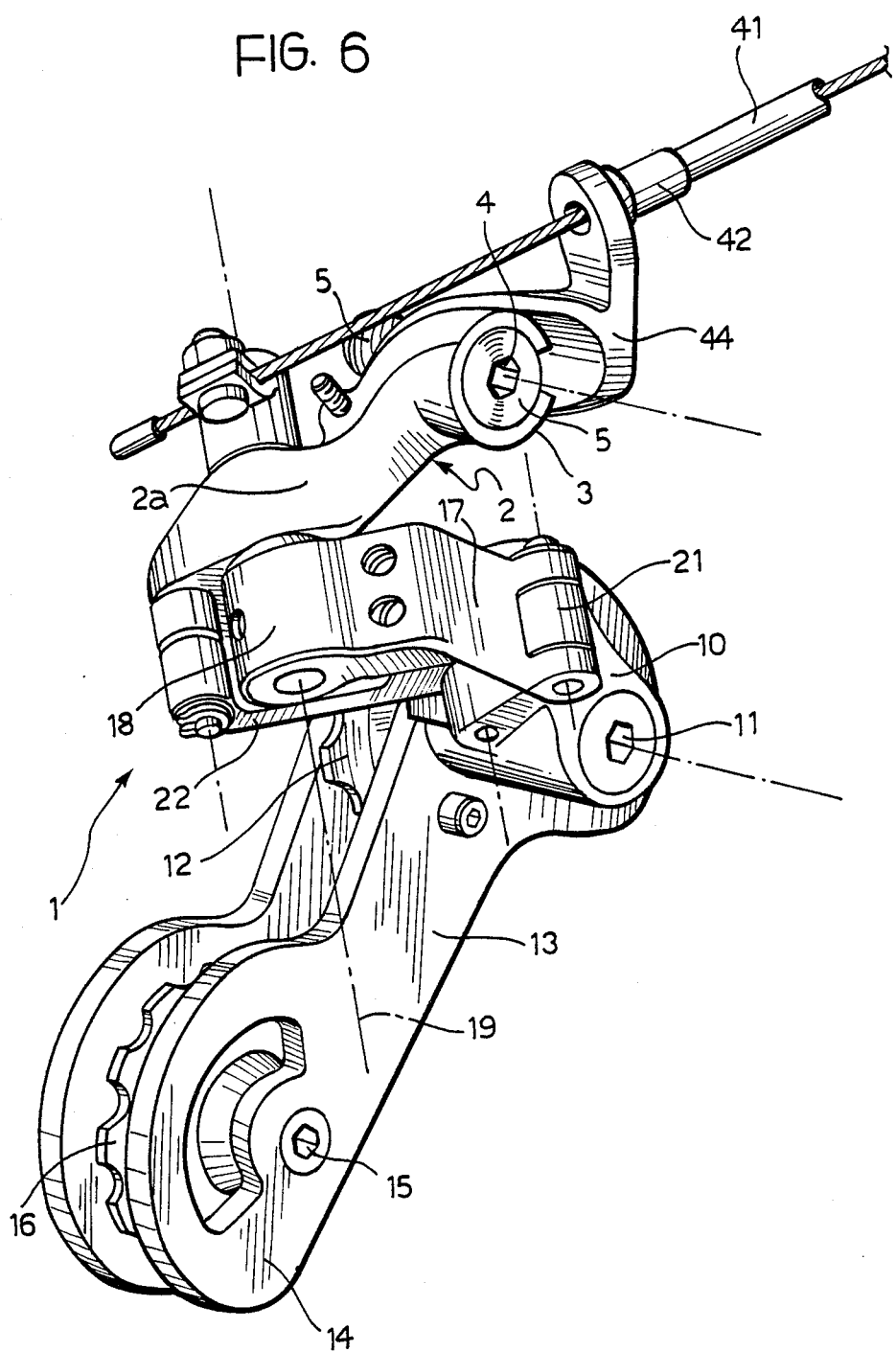

In FIGS. 1, 2 and 6, a rear derailleur for a bicycle is generally indicated 1 and includes an upper body 2. The body 2 has a cylindrical end 3 which has an axis 4 and is fixed by means of a screw 5 to an appendage 6 of the bicycle frame 7 (see FIG. 1 in particular). The appendage 6 is situated adjacent the hub of the rear wheel, whose axis is indicated 8. This hub carries a series of sprockets 9, illustrated only schematically in FIG. 1, intended to engage selectively with the bicycle chain to achieve, the various gear ratios. The lower body of the derailleur is indicated 10 and supports a chain transmission wheel 12 for rotation about an axis 11 parallel to the axis 8, as well as a resiliently-biassed chain tensioning arm 13 (of known type) which terminates in an end 14 supporting a chain tensioning wheel 16 for rotation about an axis 15.

The lower body 10 is moved relative to the upper body 2 by a control lever 17. The lever 17 carries the lower body 10 and incorporates a hub 18 which is supported for rotation about an axis 19 by a hollow cylindrical body 20 rigidly connected to the upper body 2 (FIG. 2).

In the embodiment illustrated, the axis of rotation 19 of the control lever 17 is inclined to a plane perpendicular to the axis 4 of the upper body 2. In particular, to an observer situated to the rear of the derailleur—with reference to the direction of travel of the bicycle - the axis 19 appears to be rotated slightly in an anticlockwise sense relative to that plane. The lower body 10 is articulated to the control lever 17 about an axis 21 parallel to the axis 19. It is also connected directly to the upper body 2 by means of an auxiliary connecting rod 22 (visible in FIG. 6) having its opposite ends articulated to the lower body 10 and to the upper body 2 respectively, about axes parallel to the axes 19 and 21. The auxiliary connecting rod 22 prevents the orientation of the axes 11, 15 from changing as a result of a rotation of the control lever. At the same time, the particular inclination of the axis 19 relative to the plane perpendicular to the axis 4 of the upper body 2 means that the resulting movement of the transmission wheel 12 carried by the lower body 10 has both a component parallel to the axis 8, which is necessary to cause derailing of the chain from one sprocket to another, and a component radial to that axis, which is necessary to allow for the differences between the diameters of the various sprockets.

Naturally, it would also be possible to arrange the axis 19 so that it is not inclined to the plane perpendicular to the axis 4. In this case, the movement of the wheel 12 would be essentially without a radial component relative to the axis 8. In order to avoid any interference of the wheel 12 with the larger-diameter sprockets when the wheel is brought into their plane to engage them with the bicycle chain, therefore, it would be necessary to situate the wheel 12 sufficiently far from the axis 8 and/or mount the wheel on the arm 13 at a distance from the pivoting axis of this arm. This latter arrangement would enable the rotation of the arm 13 which takes place when the chain derails onto sprockets of larger diameter (this rotation takes place in an anti-clockwise sense with reference to FIG. 1 and is caused by the fact that the larger sprockets take up a greater length of chain) to be used to obtain the required spacing of the wheel 12.

In FIG. 2, which relates, as stated, to the solution with an inclined axis 19, the region of the hub 18 of the control lever 17 is shown sectioned in a plane containing the axis 19. This plane obviously does not coincide with the plane perpendicular to the axes 4 and 11.

With particular reference to the solution illustrated in FIG. 2, the upper body 2 has a part 2a for the fixing of the upper end of the hollow cylindrical body 20. This upper end is housed in a seat 2b formed in the lower surface of the upper body 2 and, at a certain distance from its top, has a collar 20a which bears against the lower surface of the part 2a. The hollow cylindrical body 20 is retained against the part 2a of the upper body 2 by a screw 23 having a shank with a threaded end 24 which passes with clearance through a hole 25 in the upper wall of the body 20 and is screwed into a threaded blind hole 26 formed in the part 2a of the upper body 2. The screw 23 has an intermediate cylindrical portion 27 of larger diameter than the threaded shank 24, defining an annular abutment surface 28 which is urged against the lower surface of the upper wall of the cylindrical body 20. At its lower end, the intermediate portion 27 has a head 29 with a hexagonal seat 30 for the engagement of an operating key. The hub 18 of the control lever 17, as already indicated above, is mounted for rotation on the hollow cylindrical body 20 and is retained axially thereon by the head 29 of the screw 23. The hub 18 includes an end wall 32 having a central hole through which the intermediate portion 27 of the screw 23 passes with the interposition of a bush 31 of a material having a low coefficient of friction. The bush 31 includes an annular end flange 31a which is interposed between the wall 32 and the head 29 of the screw.

A helical flexion spring 33 is arranged within the hollow cylindrical body 20 coaxial with the intermediate portion 27 of the screw 23, and has axial end arms 34, 35 which are locked respectively in a seat 36 formed in the end wall 32 of the hub 18 and in a seat 37 formed in the part 2a of the upper body 2. The end arm 35 is also disposed through an axial through-hole 39 formed in the upper wall of the hollow cylindrical body 20.

The helical flexion spring 33 biasses the control lever 17 towards the position which corresponds to the engagement of the bicycle chain with the smallest diameter sprocket 9. The chain can be derailed onto sprockets of larger diameter by means of a flexible metal cable 40 having one end anchored by means of a screw 41a to the control lever 17 and the other end connected to the gear-operating lever (not illustrated). A sheath 41 is associated with the cable 40 and has an end 42 housed in a seat 43 in an appendage 44 of the upper body 2, situated in the rear region of that body with reference to the direction of travel of bicycle. The other end 45 (FIG. 1) of the sheath 41 bears against an appendage 46 of the bicycle frame 7.

As can be seen, the stresses deriving from the loading of the helical flexion spring 33 are discharged solely to the body of the hub 18 of the control lever 17, whilst the articulation pin 21 and the articulation pins of the ends of the connecting rod 22 are not stressed. The spring 33 is protected from dirt, being situated within the hollow cylindrical body 20, and ensures the necessary biassing force without imposing a lower limit on the length of the control lever 17 at the design stage.

Figure 3:
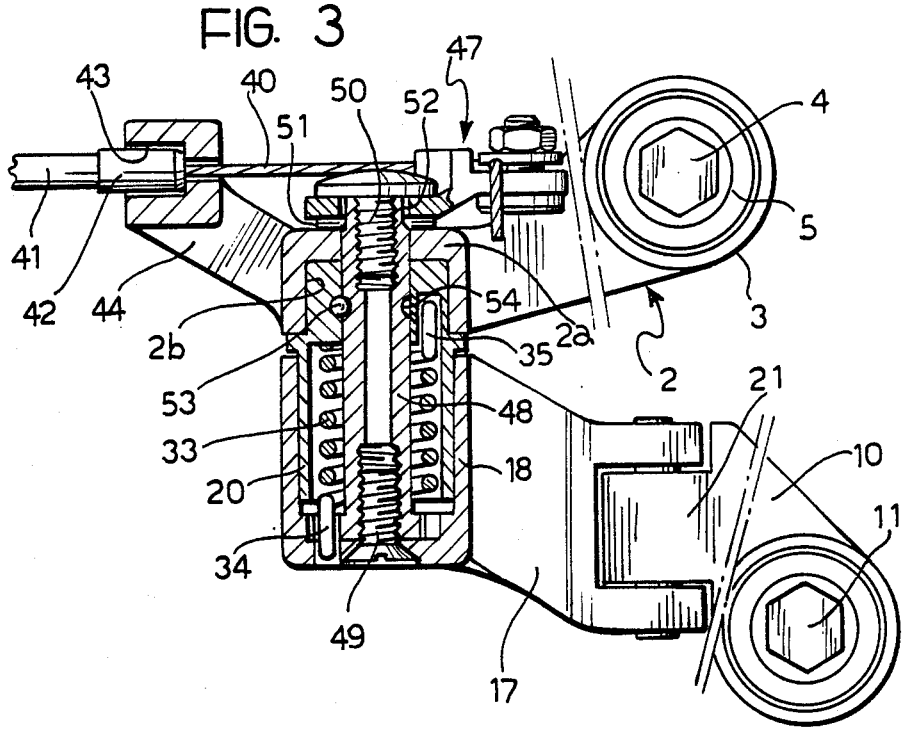

FIG. 3 shows a possible variant of the solution illustrated in FIG. 2. In FIG. 3, the parts in common with those illustrated in FIG. 2 are indicated by the same reference numerals. The main difference with respect to the solution of FIG. 2 lies in the fact that, in this case, the operation of the control lever 17 is achieved by acting, through the cable 40, on a crank 47 which is rigidly connected to the control lever 17. A tubular pin 48 passes through two coaxial holes formed in the upper wall of the body 20 and in the part 2a of the upper body 2 respectively. A front end wall of the hub 18 is fixed by means of a screw 49 to the lower end of the pin 48. The upper end of the pin 48 is rigidly connected for rotation with the crank 47 by means of a splined coupling 52. The crank 47 is retained axially by a screw 50 which is screwed into the pin 48. A washer, indicated 51, of a material having a low coefficient of friction is interposed between the crank 47 and the upper surface of the body 2. The hollow cylindrical body 3 is prevented from rotating relative to the upper body 2 by means of a transverse pin 53 which engages the body 20 and the part 2a of the upper body 2. The pin 53 does not prevent rotation of the pin 48, since the latter has a circumferential groove 54 in correspondence with this pin.

Figure 4:
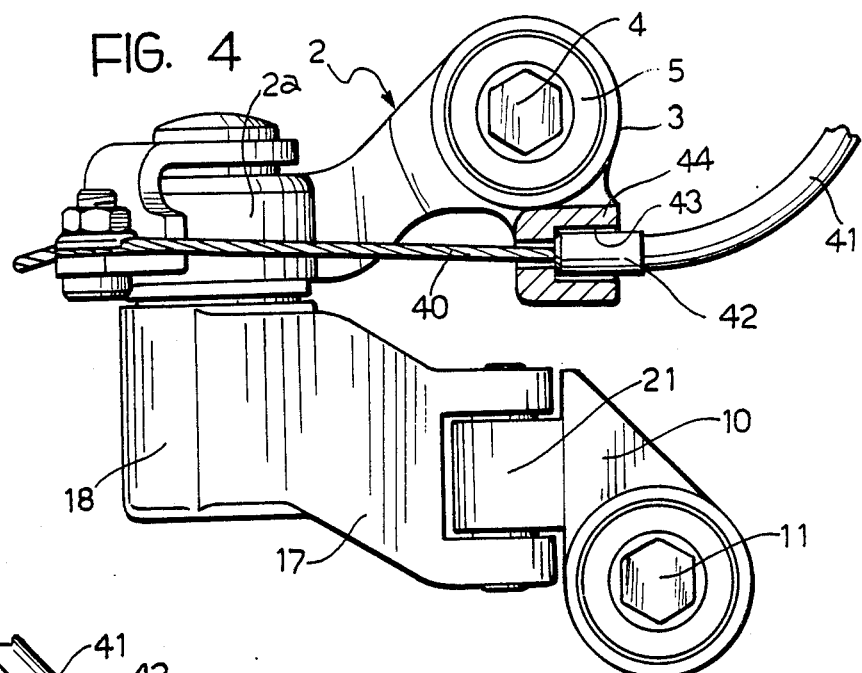

FIG. 4 differs from FIG. 3 solely in that, in this case, the appendage 44 which houses the end 42 of the sheath 11 is situated in the front region of the upper body 2 with reference to the direction of travel of the bicycle. In this way, it is possible to use a shorter sheath 41 and also to reduce the length of the flexible metal cable 40. FIG. 6 also relates to a solution of this type.

Figure 5:
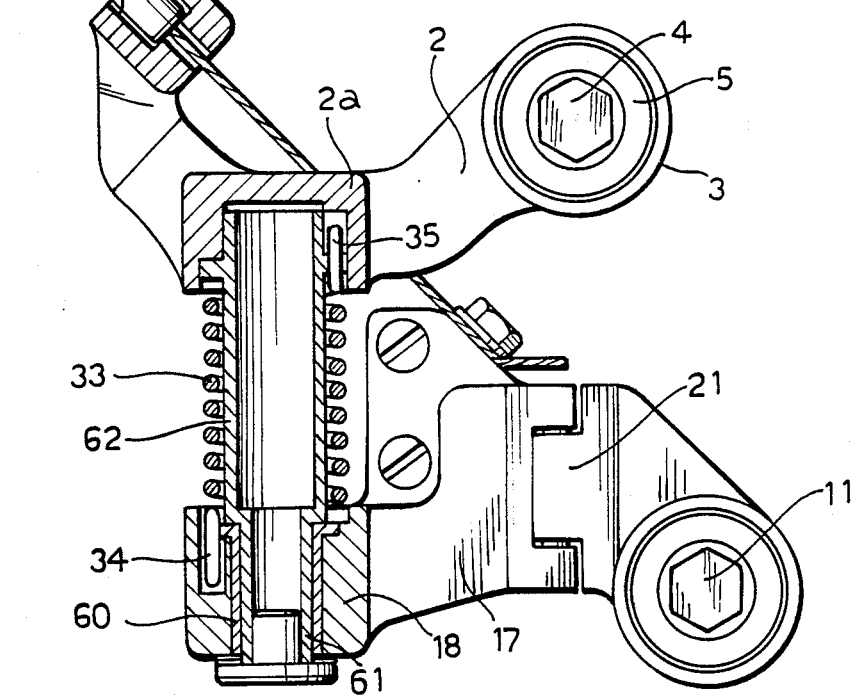

The solution illustrated in FIG. 5 differs from that illustrated in FIG. 2 mainly in that its helical flexion spring 33 is not housed within the hub 18 of the control lever 17. In this case, in fact, the hub 18 is rotatably mounted by means of a bush 60 on a reduced-diameter lower end 61 of the cylindrical body 62. The latter is fixed—for example, by driving with interference, or in some other way—to the upper body 2. The end arms 34, 35 of the helical torsion spring 33 are anchored to the hub 18 and to the part 2a of the upper body 2 respectively.

Naturally, the principle of the invention remaining the same, the forms of embodiment and details of construction may be varied widely with respect to those described and illustrated purely by way of example, without thereby departing from the scope of the present invention.

I claim:

1. A rear derailleur for bicycle gears, comprising:
   an upper body which can be fixed to the bicycle frame,
   a lower body carrying transmission means for the bicycle chain and being connected to the upper body so as to be movable relative thereto to bring the chain into selective engagement with a series of sprockets carried by the hub of the rear wheel of the bicycle, and flexible cable means for causing movement of the lower body, wherein it further includes a member connected rigidly to the upper body, a control lever supported for rotation on said member and carrying the lower body, and a helical flexion spring operatively interposed between the control lever and the upper body with its axis coincident with an axis of rotation of the control lever.

2. A derailleur according to claim 1, wherein the lower body is articulated to the control lever about an axis parallel to the axis of rotation of the control lever and wherein an auxiliary connecting rod is provided which also connects the lower body directly to the upper body, the auxiliary connecting rod having its opposite ends articulated to the upper body and to the lower body respectively, about axes parallel to the axis of rotation of the control lever.

3. A derailleur according to claim 2, wherein the axis of rotation of the control lever is inclined to a plane perpendicular to the axis of the hub of the bicycle wheel in the mounted condition of the derailleur.

4. A derailleur according to claim 2, wherein the control lever includes a hub, and wherein a hollow cylindrical body is rigidly connected to the upper body and supports the hub for rotation.

5. A derailleur according to claim 4, wherein the helical flexion spring is situated within the hollow cylindrical body which rotatably supports the hub of the control lever.

6. A derailleur according to claim 4, wherein the upper body has an appendage and the flexible control cable means comprise a metal cable anchored to the control lever and a sheath having one end bearing against an appendage of the upper body.

7. A derailleur according to claim 4, wherein the upper body has an appendage and a crank is connected for rotation with the control lever, and wherein the flexible control cable means comprise a metal cable anchored to the crank and a sheath having one end bearing against an appendage of the upper body.

8. A derailleur according to claim 7, wherein the appendage of the upper body against which the end of the sheath bears is situated in the front region of the upper body—with reference to the direction of travel of the bicycle—with the seat for the sheath facing forwards.

* * * * *